(12) United States Patent
Chiba et al.

(10) Patent No.: US 6,950,385 B1
(45) Date of Patent: Sep. 27, 2005

(54) INFORMATION RECORDING APPARATUS

(75) Inventors: Norio Chiba, Chiba (JP); Yasuyuki Mitsuoka, Chiba (JP); Nobuyuki Kasama, Chiba (JP); Takashi Niwa, Chiba (JP); Kunio Nakajima, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/601,815

(22) PCT Filed: Feb. 10, 1999

(86) PCT No.: PCT/JP99/00572

§ 371 (c)(1),
(2), (4) Date: Sep. 25, 2000

(87) PCT Pub. No.: WO99/41741

PCT Pub. Date: Aug. 19, 1999

(30) Foreign Application Priority Data

Feb. 10, 1998 (JP) .................................. 10-028914
Mar. 20, 1998 (JP) .................................. 10-072787

(51) Int. Cl.[7] .............................. G11B 7/00; G11B 9/00
(52) U.S. Cl. .................... 369/126; 369/100; 369/13.33
(58) Field of Search ........................... 369/100, 126, 369/53.25, 53.26, 53.27, 13.03, 13.33

(56) References Cited

U.S. PATENT DOCUMENTS

| | | | | |
|---|---|---|---|---|
| 5,325,342 A | * | 6/1994 | Vo-Dinh | 369/13.01 |
| 5,513,168 A | * | 4/1996 | Fujihira et al. | 369/126 |
| 5,793,743 A | * | 8/1998 | Duerig et al. | 369/126 |
| 5,982,716 A | * | 11/1999 | Kino et al. | 369/14 |
| 6,046,972 A | | 4/2000 | Kuroda et al. | 369/126 |
| 6,101,164 A | * | 8/2000 | Kado et al. | 369/126 |
| 6,147,959 A | * | 11/2000 | Ohyama | 369/126 |
| 6,229,609 B1 | * | 5/2001 | Muramatsu et al. | 356/601 |
| 6,333,497 B2 | * | 12/2001 | Shimada et al. | 250/201.3 |
| 6,466,537 B1 | * | 10/2002 | Kasama et al. | 369/126 |
| 6,496,468 B2 | * | 12/2002 | Hajjar et al. | 369/13.33 |
| 6,535,474 B1 | * | 3/2003 | Yee et al. | 369/112.01 |
| 6,584,062 B1 | * | 6/2003 | Naya | 369/112.27 |

FOREIGN PATENT DOCUMENTS

| | | |
|---|---|---|
| EP | 0688014 | 12/1995 |
| EP | 0860726 | 8/1998 |

OTHER PUBLICATIONS

Patent Abstracts of Japan vol. 1998, No. 02, Jan. 30, 1998 publication No. 09269329, publication date Nov. 14, 1997.
Patent Abstracts of Japan vol. 1997, No. 05, May 30, 1997 publication No. 09022538, publication date Jan. 21, 1997.

* cited by examiner

Primary Examiner—Thang V. Tran
Assistant Examiner—Bach Vuong
(74) Attorney, Agent, or Firm—Adams & Wilks (57) ABSTRACT

In an information recording apparatus for recording information onto a recording medium by utilizing a technology in a near-field microscope, the information recording apparatus carries out recording with reliability and density. An optical probe (1) or micro-cantilever (12) utilized in a near-field microscope is used as a recording probe (26). The recording probe (26) at its tip is heated by laser light (28) illumination or heating by an electric heating element to radiate microscopic-region thermal energy through the tip to a recording medium (3). This makes it possible to record microscopically information onto the recording medium (3) that varies in physical properties due to heating. Furthermore, thermal energy is provided to a recording position through an auxiliary heat radiating means thereby enabling recording more positively.

31 Claims, 5 Drawing Sheets

INFORMATION RECORDING APPARATUS

CROSS-REFERENCE TO RELATED APPLICATIONS

This application is a U.S. national stage application of copending International Application Ser. No. PCT/JP99/00572, filed Feb. 10, 1999, claiming a priority date of Feb. 10, 1998, and published in a non-English language.

TECHNICAL FIELD

The present invention relates to information recording apparatuses for recording information with a high density to recording media and, more particularly, to an information recording apparatus capable of recording information with a high density suited for reproducing through light utilizing near-field light.

BACKGROUND OF THE INVENTION

In the existing information recording devices, high density of information recording is realized by optical recording as represented by a magneto-optical recording scheme and a phase change recording scheme. For example, in the magneto-optical recording scheme, laser light is applied onto a recording medium having a magnetic film formed on a surface thereof. The orientation of magnetization is controlled by the synergism of reduction of coercive force due to temperature rise at a spot of applied laser light and application of external magnetic field, thereby enabling binary recording.

In the magneto-optical recording scheme, recorded information can be reproduced by illuminating, to a recording medium, laser light weaker in intensity than that in recording and then specifying an orientation of magnetization due to a state of polarization of a reflection or transmission light thereof.

Meanwhile, in the phase change recording scheme, laser light is applied to a recording medium formed with a phase change film on a surface thereof. The temperature caused at a spot of the illuminated laser light is varied by varying the intensity of laser light to control in crystallizing and amorphosizing of the phase change film, thus enabling binary recording.

In the phase change recording scheme, recorded information can be reproduced by illumination with laser light weaker in intensity than that in recording to the recording medium and distinguishing between a crystalline phase and an amorphous phase due to an intensity of reflection thereof.

The above-explained magneto-optical recording scheme and phase change recording scheme both realize high-density information recording and reproducing by the microscopic spot of laser light. Consequently, the information recording density on a recording medium is limited to by a spot diameter obtained by focusing laser light. Accordingly, in the conventional information recording apparatuses employing the magneto-optical recording scheme and the phase change recording medium, because a spot obtained by focusing laser light is utilized as propagation light, the spot diameter could not have been decreased smaller than a diffraction limit of laser light, i.e. a half of a laser light wavelength.

Under the circumstances, there is a proposal of an information recording method/apparatus for an optical memory in which laser light to be turned to propagation light is applied toward a microscopic aperture having a diameter less than a wavelength of applied laser light, e.g. one-tenth of the wavelength, to utilize near-field light produced at the microscopic aperture (including both Evanescent field and far field). In this information recording method, a mechanism of achieving information recording to a recording medium is basically the same as the near-field producing system of an information reproducing method/apparatus for reproducing recorded information on the recording medium by utilization of near-field light. That is, the information reproducing method/apparatus for an optical memory utilizing near-field light can be utilized at the same time as an information recording method/apparatus.

Conventionally, there have been, as apparatuses utilizing near-field light, near-field microscopes using a probe having a microscopic aperture as mentioned above, utilized in observing optical characteristics on a microscopic region of a sample. As one of the near-field light utilizing schemes in the near-field microscopes, there is a scheme that a microscopic aperture of a probe and a sample surface is brought into proximity in distance to nearly a diameter of the probe's microscopic aperture so that near-field can be produced at the microscopic aperture by introducing propagation light through the probe and toward the probe's microscopic aperture. In this case, the produced near-field light interacts with the sample surface to cause scattering light to be detected involving an intensity or phase reflecting a microscopic structure on the sample surface by a scattered light detector system. This achieves an optical image observation with a resolution that has never been realized in the conventional optical microscopes. The optical memory information recording method utilizing near-field light as above utilizes an observation method for the near-field microscope.

Accordingly, utilizing near-field light makes it possible to record on a microscopic information recording unit surpassing a recording density on the conventional information recording medium and to reproduce from the information recording medium thus recorded. Furthermore, as disclosed in Japanese Patent Laid-open No. 98885/1995 and Japanese Patent Laid-open No. 272279/1995, in information reproducing, the selection of a probe shape having a microscopic aperture allows for selection of information unit in reproducing. Thus, there are proposals to achieve an increase of density in forms not existing in the conventional information recording media.

As discussed above, the information recorded by the magneto-optical recording scheme is due to determination of a light polarization state of a reflected or transmitted portion of the applied light and requires the device to pass the reflection or transmission light to a photodetector. The loss of light in that case is large. Near-field light in nature possesses an extremely low intensity. It is therefore difficult to employ a magneto-optical recording scheme in an optical memory information reproducing method utilizing near-field light. At the same time, also difficult is its adoption as an optical memory information recording method.

Meanwhile, where a phase change recording method is employed in an optical memory information recording/reproducing method utilizing near-field light explained above, information recording must be made by a heat mode in which laser light energy is utilized by being transformed into thermal energy. However, because the near-field light caused at a microscopic aperture is very weak in energy, it is difficult to realize information recording by a phase change recording scheme. Even where a sufficiently high intensity of laser light is introduced to a microscopic aperture, the microscopic aperture itself gives off heat, resulting in possible damage to the recording medium or the probe tip having a microscopic aperture or adverse effect upon a control system thereof.

Also, when a probe having a microscopic aperture as above is employed as an optical memory head, the access of the probe to a distance for utilizing near-field light on a recording medium usually utilize cantilever control and detection technology for the atomic force microscope (AFM). However, in the AFM technology utilization in the near-field microscope, the transfer of heat energy from the cantilever to a sample is not considered. Due to this, various problems arise in employing a magneto-optical recording scheme or a phase change recording scheme. For example, the near-field microscopes often use a cantilever formed by an optical fiber having a microscopic aperture and propagating light through the microscopic aperture. The cantilever type optical fiber has a spring constant having a value greater than that of a silicon micro-cantilever used in the AFM. In contact control to detect a repelling force where the cantilever is contacted with a sample, there is high possibility of damaging the cantilever itself or a sample surface.

Meanwhile, in non-contact control that a sample-to-cantilever distance is increased as compared to that of contact control to microscopically vibrate the cantilever and detect modulation due to an attractive force acting between the cantilever and the sample surface, and in dynamic control that a cantilever is vibrated and the cantilever is brought into contact with a sample surface to acquire surface information, the heat transfer to the recording medium through near-field light is not steadily made. Thus, the temperature as a recording condition is impossible to reach.

DISCLOSURE OF THE INVENTION

An information recording apparatus according to one aspect of the present invention comprises a probe for producing or scattering near field light, probe access means for causing a tip of the probe to access a recording medium probe scanning means for scanning the tip of the probe over the recording medium, and heat radiating means for radiating heat through the tip of the probe, wherein the recording medium is provided on the surface with a thin film that varies in physical properties in response to heating the surface.

Accordingly, heating can be made from the tip of the probe to a microscopic region on a recording medium, making it possible to record information with a high density as can be detected and reproduced of near field light by a near-field microscope technology.

Also, an information recording apparatus according to the invention is characterized in that the heat radiating means is an electric heating element.

Accordingly, an electric heating element as a heater member can be directly arranged as heat radiating means on the probe. Thus, efficient heat transfer is achieved, making the structure more compact.

Also, an information recording apparatus according to the invention is characterized in that the heat radiating means is a laser light source.

Accordingly, by using a laser light source as the heat radiating means, the laser spot from the laser light source can be freely applied onto the recording probe. Because the heating position on the recording probe can be freely set, the shape of the recording probe is free to select.

Also, an information recording apparatus according to the invention is characterized in that the probe is provided with a microscopic aperture at a tip so that laser light from the laser light source can be introduced toward the microscopic aperture.

Accordingly, the use of the probe having the microscopic aperture makes it possible to utilize the laser light produced from the laser light source used as the heat radiating means as optical energy to produce near field light, enabling high density recording by near field light.

Also, an information recording apparatus according to the invention is characterized in that the microscopic aperture is provided with a metal film on the surface of the probe except for the tip thereof.

Accordingly, because a microscopic aperture optically sufficiently closed is formed at the recording probe tip, the laser light emitted from the laser light source used as the heat-radiating means is utilized with higher efficiency as optical energy to produce near field light. Thus, high density recording is possible by near field light.

Also, an information recording apparatus according to another aspect of the invention comprises a probe for producing or scattering near field light, probe access means for causing a tip of the probe to access a recording medium, probe scanning means for scanning the tip of the probe over the recording medium, heat radiating means for radiating heat through the tip of the probe, and auxiliary heat radiating means to heat up the recording medium, wherein the recording medium is provided on the surface with a thin film that varies in physical properties in response to heating the surface.

Accordingly, in addition to heat energy offered from the probe tip, the auxiliary heat radiating means is provided to heat a microscopic region on a recording medium thus enabling information recording more positively and higher in reliability.

An information recording apparatus according to another aspect of the invention comprises a probe having a sharpened tip, probe access means for causing the tip of the probe to access a recording medium, probe scanning means for scanning the tip of the probe over the recording medium, and an illumination light source for illuminating a backside of the recording medium and producing near field light on a surface of the recording medium, wherein the recording medium is provided at the surface with a thin film that varies in physical properties in response to heating the surface.

Accordingly, the sharpened probe tip is inserted in a region of near field light produced on the surface of a recording medium by illuminating a backside of the recording medium to thereby scatter the near field light. By intensified energy caused by a combination of the scattering light and the near field light, heating is achieved with a sufficient size for recording information to the recording medium. Thus, high density recording of information is possible as can be detected and reproduced of near field light by a near-field microscope technology.

Also, an information recording apparatus according to the invention is characterized in that the illumination light source illuminates the surface of the recording medium and produces near field light on the surface of the recording medium.

Accordingly, because near filed light is produced on the surface of a recording medium by illuminating the surface of the recording medium as a recording surface, high density recording of information can be achieved without transmission of illumination light through the recording medium, i.e. even onto an opaque recording medium for illumination light.

A method of recording information according to one aspect of the invention comprises a probe access process of causing a tip of a probe for producing or scattering near field light to access a recording medium, a probe scanning process of scanning the tip of the probe to a desired position on the recording medium, and a heat recording process of radiating heat energy through the tip of the probe for locally heating up the recording medium and recording information on the recording medium.

Accordingly, microscopic and local heating is possible to a desired point on a recording medium by heat energy radiated through the probe tip, enabling high density recording of information.

Also, a method of recording information according to the invention is characterized by further comprising an auxiliary heating process of auxiliary heating the recording medium.

Accordingly, in addition to the heat energy offered through the probe tip, the auxiliary heating process is provided for further heating the region where the heat energy is applied. Thus, heating is possible more positively in a sufficient size, enabling high density recording of information with reliability.

Furthermore, a method of recording information according to another aspect of the invention comprises an illumination process of illuminating the surface of a recording medium and producing near field light on the recording medium, a probe access process of causing a sharpened tip of a probe to access the recording medium and recording information on the recording medium by locally intensified energy caused due to insertion of the tip of the probe in a region of the near field light, and a probe scanning process of scanning the tip of the probe to a desired position on the recording medium.

Accordingly, the recording medium at its backside is illuminated to produce near field light on the surface of the recording medium. The sharpened probe tip is inserted in a region of the near field light to scatter the near field light. The scattered light and the produced near field light are combined to cause intensified energy having greater energy. Consequently, sufficient amount of heating is possible for recording information to the recording medium, enabling positive and high density recording of information.

Furthermore, a method of recording information according to the invention is characterized in that the illumination process is performed to illuminate a backside of the recording medium and produce near field light on the recording medium.

Accordingly, the surface of a recording medium as a recording surface is illuminated to produce near field light on the surface of the recording medium. The probe tip is inserted in a region of the near field light to cause intensified energy for achieving greater heating. Thus, positive and high density recording of information is made possible even for an opaque recording medium for illumination light.

BEST MODE FOR CARRYING OUT THE INVENTION

Hereunder, embodiments of information recording apparatuses according to the present invention will be explained in detail based on the attached drawings.

Embodiment 1

Figure 1:
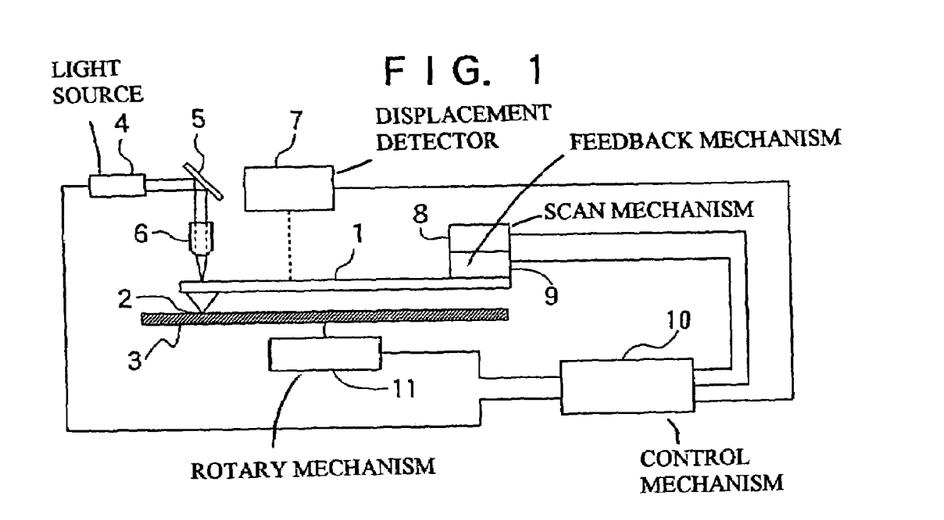
FIG. 1 is a block configuration diagram of an information recording apparatus according to Embodiment 1 of the present invention.

FIG. 1 illustrates a block configuration diagram of an information recording apparatus according to Embodiment 1.

Figure 4:
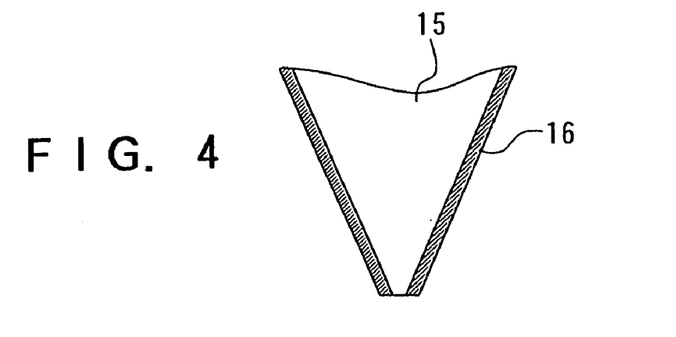
FIG. 4 is a view showing an embodiment of an aperture of the micro-cantilever adopted for the information recording apparatus according to the invention.
Figure 5:
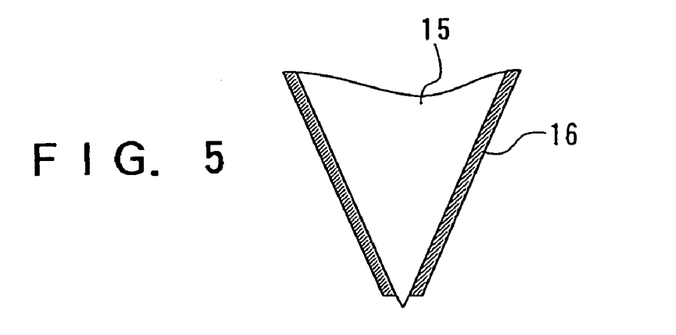
FIG. 5 is a view showing another embodiment of an aperture of the micro-cantilever adopted for the information recording apparatus according to the invention.

In FIG. 1, a cantilever type optical probe 1 has an aperture formed of a material fully transmissive of light, e.g. dielectric, and a microscopic aperture 2 provided at a tip thereof. The light from a heater light source 4, preferably coherent laser light, is introduced to the microscopic aperture 2 at a backside of the cantilever type optical probe 1 through an optical system formed by a mirror 5 and focusing optical system 6. Here, the microscopic aperture 2 of the cantilever type optical probe 1 has a diameter fully smaller than a wavelength of laser light to be introduced, e.g. in a size of nearly several tens nano-meters. Also, in the microscopic aperture 2 the dielectric 15 as an aperture is covered with a metal film 16 as shown in FIG. 4. The dielectric 15 is formed so that only a tip is exposed in a planar state. The exposed tip of the dielectric 15 may be in a sharpened state as shown in FIG. 5.

By introducing laser light to the microscopic aperture of the cantilever type optical probe 1, near-field light is caused at the microscopic aperture 2. The cantilever type optical probe 1 is caused to access by a conventional AFM technology, i.e. a probe displacement detector mechanism 7 and a feedback mechanism 9, to include the surface of a recording medium 3 in a region of near-field light occurring at the microscopic aperture 2.

The recording medium 3, for example, is in a disk form to be rotated by a rotary mechanism 11. The cantilever type optical probe 1 is to be moved together with a scan mechanism 8 to a desired location on the recording medium 3. Also, the recording medium 3 is provided on its surface with a thin film having a property capable of recording information by local heating, e.g. a phase change film used in a phase change recording scheme. Meanwhile, the heater light source 4, the probe displacement detector mechanism 7, the scan mechanism 8, the feedback mechanism 9, and the rotary mechanism 11 are controlled by a control mechanism 10.

The cantilever type optical probe 1 can be fabricated in a thin form with a small spring constant by a silicon process, similarly to a conventional micro-cantilever for use in an AFM. This allows for overcoming a problem to be encountered in controlling, in contact control, an optical fiber probe having a comparatively large value of a spring constant used often in the near-field microscope as mentioned before. Accordingly, by controlling the cantilever type optical probe 1 by contact control, the microscopic aperture 2 can be held in a state of fully proximity to the recording medium 3. Thus, energy of near-field light occurring at the microscopic aperture 2 can be transferred onto the recording medium 3 with efficiency.

Accordingly, near-field light is caused at the microscopic aperture 2 by focusing the laser light from the heater light source 4 so that the heat energy given off by the near-field light can be provided steadily to a desired point on the recording medium 3. Thus, it is possible to record information with high density in a unitary size of nearly the microscopic aperture 2 on a phase change film formed over the recording medium 3.

Also, the laser light given off by the laser light source can be directly introduced toward the microscopic aperture of the cantilever type optical probe at the backside of the cantilever type optical probe thereby reducing a distance of passing through the dielectric of the cantilever type optical probe. Consequently, it is possible to reduce energy loss of the laser light and hence produce at the microscopic aperture near-field light with sufficient energy for causing the phase change film to attain a phase shift temperature.

Incidentally, the above explanation used, as a recording probe, the optical probe having the microscopic aperture is used. Alternatively, this may be replaced by a conventional micro-cantilever used in an AFM so that the laser light given off by the heater light source 4 is applied to the micro-cantilever to heat up the micro-cantilever itself thereby providing the heat energy radiated at a tip of the micro-cantilever to the recording medium 3. The tip of the micro-cantilever is generally finer than a diameter of the microscopic aperture possessed by the above optical probe, through which heat energy is radiated and localized to nearly a tip size. It is therefore possible to record information with high density surpassing a recording density of the conventional optical memory recording apparatus.

Figure 6:
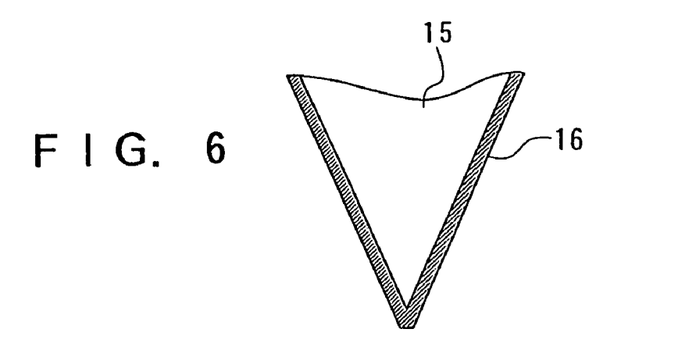
FIG. 6 is a view showing still another embodiment of an aperture of the micro-cantilever adopted for the information recording apparatus according to the invention.

Meanwhile, the above-explained method of utilizing the light from the heater light source to heat up the micro-cantilever is also applicable to the case that, in using the above cantilever type optical probe, the optical probe at its tip is completely covered by a metal film 16 as shown in FIG. 6. In this case, the light introduced through the dielectric 15 is utilized not to produce near-field light but to heat up the metal film 16. Heat energy can be radiated through its sharpened tip.

Figure 2:
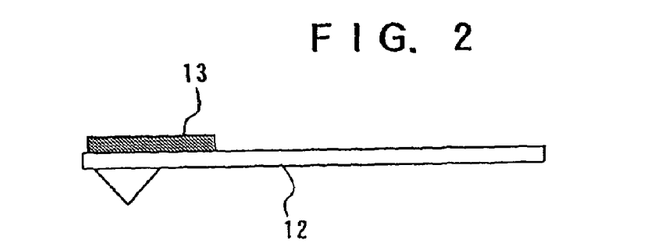
FIG. 2 is a view showing an embodiment of a micro-cantilever adopted for the information recording apparatus according to the invention.

Furthermore, in the method of heating the micro-cantilever explained above, a heater element 13 may be arranged on the micro-cantilever 12 as shown in FIG. 2 in place of the structure formed by the heater light source 4, the mirror 5 and the focusing optical system 6. The micro-cantilever 12 at its tip is heated up due to the heat given off by the heater element 13. Heat energy can be radiated through the tip thus obtaining the same effect as heating by the heater light source. Also, by thus arranging the heater element on the micro-cantilever, it is possible to eliminate the structure having the heater light source 4, mirror 5 and the focusing optical system 6. Thus, the information recording apparatus can be made compact in structure.

Figure 3:
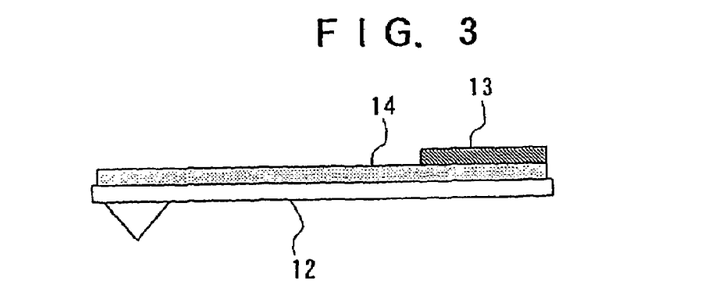
FIG. 3 is a view showing another embodiment of a micro-cantilever adopted for the information recording apparatus according to the invention.

Furthermore, a heat conductive layer 14 may be arranged, as shown in FIG. 3, between the micro-cantilever 12 and the heater element 13 in FIG. 2. The heater element 13, even if placed not on the tip of the micro-cantilever but in a position distant from the tip, will not result in loss of thermal conductivity owing to the heat conductive layer 14. Further, a small spring constant of the micro-cantilever 12 is utilizable.

Furthermore, the micro-cantilever itself may be formed as a heater element so that the heater element 13 and the heat conductive layer 14 may be eliminated.

Embodiment 2

Figure 7:
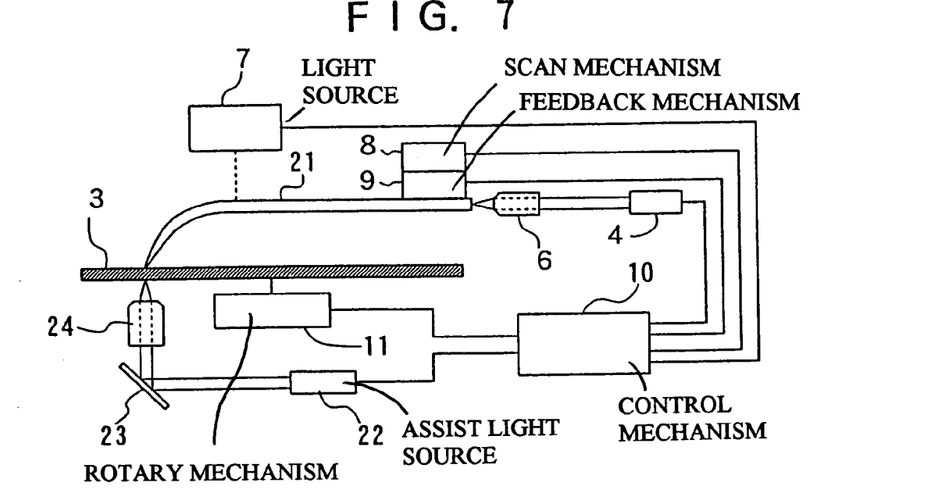
FIG. 7 is a block configuration diagram of an information recording apparatus according to Embodiment 2 of the present invention.

FIG. 7 illustrates a block configuration diagram of an information recording apparatus according to Embodiment 2. Incidentally, the parts common to those of FIG. 1 are denoted by the same reference numerals.

In FIG. 7, an optical fiber probe 21 is adopted as a recording probe having, at a tip thereof, a not-shown microscopic aperture to which light given off by a heater light source 4, preferably coherent laser light, is introduced through a condensing optical system 6. The microscopic aperture of the optical fiber probe 21 herein has a diameter sufficiently smaller than a wavelength of laser light to be introduced, e.g. in a size of nearly several tens nano-meters. Furthermore, the optical fiber probe 21 is in an L form directed toward the surface of a recording medium 3. Because the handling ability of this probe is like that of a conventional AFM cantilever, it is convenient to utilize the AFM technology.

The microscopic aperture of the optical fiber probe 21 when introduced with laser light causes near-field light at its microscopic aperture part. Also, the optical fiber probe 21 is caused to access the recording medium such that the surface of the recording medium 3 is included in a near-field light region at the microscopic aperture part by the conventional AFM technology, that is, the probe displacement detector mechanism 7 and the feedback mechanism 9.

The recording medium 3 is provided, on the surface, with a thin film having a physical property capable of recording information due to local heating up, e.g. a phase change film used in a phase change recording scheme, as was explained in Embodiment 1.

In the above structure, the optical fiber probe 21 is selectively moved over the recording medium 3 to provide heat energy given off by the near-field light caused at the microscopic part of the optical fiber probe 21 locally to the phase change film formed on the recording medium 3. However, the energy due to the near-field light produced by passing through the optical fiber probe does not have a sufficient intensity for reaching a phase shift temperature of the phase change film.

Accordingly, light, preferably coherent laser light, is locally applied, at a backside of the recording medium 3, to a point having the microscopic aperture of the optical fiber probe 21. This assists to heat up the phase change film area where the microscopic aperture is located. In FIG. 7, the laser light from an assist light source 22 is applied through an optical system formed by a mirror 23 and condensing optical system 24 to the backside of the recording medium 3, thereby giving assistance to heating-up.

This complements the probe 21 and overcomes the insufficiency in thermal energy needed for elevating the phase change film to the phase shift temperature encountered where providing only heat energy due to the near-field light produced at the microscopic aperture of the probe 21. Thus, high density of information recording is achieved on the phase change film formed on the recording medium 3. Incidentally, it is preferred to making the amount of heating by near-field light, or the intensity of laser light for causing near-field light, to as small as possible with respect to the amount of heating by the assist light source, or the intensity of laser light at the assist light source. This makes it possible to reduce the intensity of laser light to be introduced to the optical fiber probe 21, preventing the microscopic aperture part from being deformed or damaged due to laser-light heating. Furthermore, because the optical system for the assist light source is arranged on a back side of the recording medium, the recording medium in its surface is to be effectively utilized.

Figure 8:
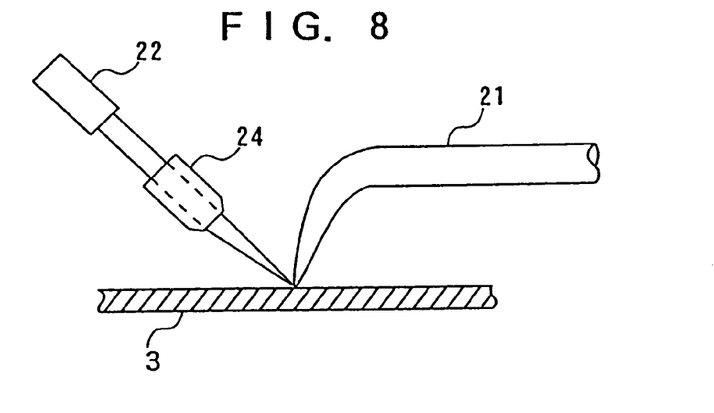
FIG. 8 is a view for explaining an auxiliary heating method by an assist light source of the information recording apparatus according to Embodiment 2 of the invention.

In the above explanation, the assist light source and its optical system were arranged on the back side of the recording medium wherein the laser light from the assist light source is to be applied to a point on the backside of the recording medium opposed to the microscopic aperture of the recording probe. Alternatively, as shown in FIG. 8, the assist light source and the focusing optical system may be arranged on the surface side of the recording medium so that the laser light from the assist light source can be applied to a desired point of the recording medium. In this case, because the assist light source and focusing optical system are arranged only on the surface side of the recording medium, the apparatus structure is made compact thus effectively utilizing the backside of the recording medium.

It should be noted that an optical fiber, a light guide or the like is to be appropriately selected in place of the optical system structured by the mirror 23 and the focusing optical system 24.

Figure 9:
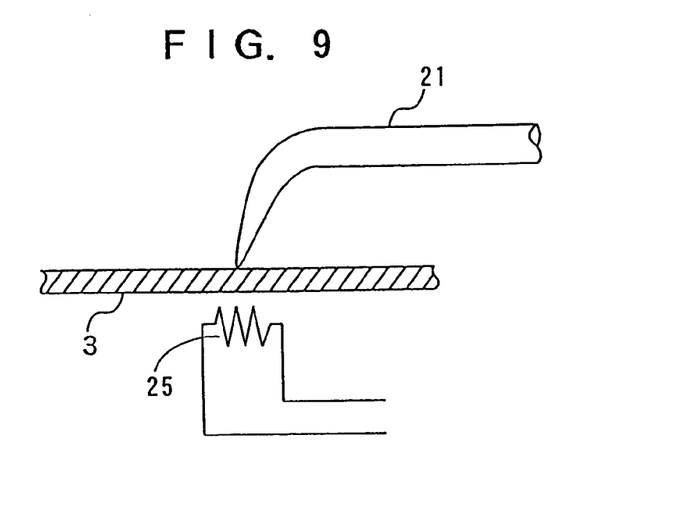
FIG. 9 is a view for explaining an auxiliary heating method by a resistance heater of the information recording apparatus according to Embodiment 2 of the invention.

Furthermore, in place of the assist light source 22 to assist heating the recording medium, a resistance heater 25 may be arranged as shown in FIG. 9 such that the heat energy on the resistance heater 25 be radiated to a desired recording point. In this case, it is possible to replace the resistance heater 25 with heating means such as an infrared-ray lamp or heat conversion element.

Incidentally, in Embodiments 1 and 2 described above, the information recorded on the recording medium can be reproduced, for example, by a near-field light detection technology for the near-field microscope, i.e. a method that near-field light localized on a recording medium is scattered into scattered light to be detected intensity change or phase change.

Embodiment 3

Figure 10:
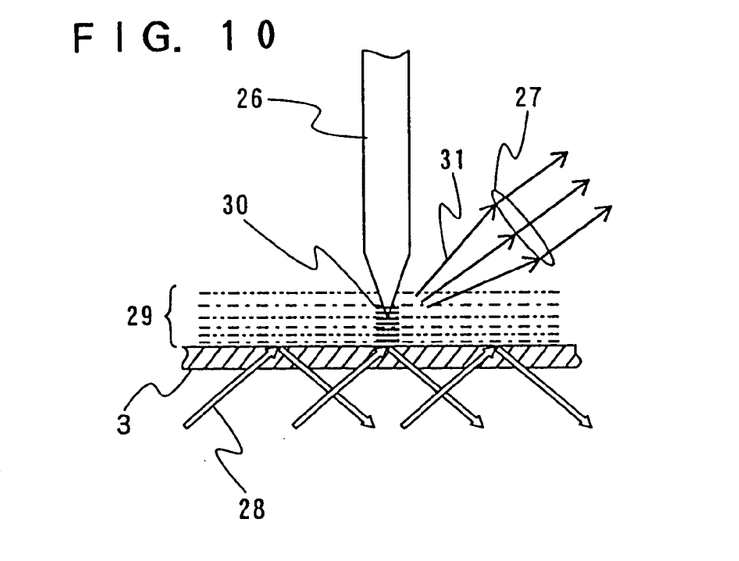
FIG. 10 is a view for explaining an information recording method according to Embodiment 3 of the invention.

FIG. 10 is a figure for explaining an information recording method with an information recording apparatus according to Embodiment 3.

In FIG. 10, a recording probe 26 has a sharpened tip, e.g. a micro-cantilever for use in AFM or a probe used in an STM (Scanning Tunnel Microscope). In particular, a metal probe is preferred. Meanwhile, a recording medium 3 is formed, for example, with a phase change film for use in a phase change scheme as was explained in Embodiment 1.

Accordingly, light, preferably coherent laser light, is locally applied, at a backside of the recording medium 3, to a point at which the microscopic aperture of the optical fiber probe 21 is located. This assists in heating up the phase change film area where the microscopic aperture is located. In FIG. 7, the laser light from an assist light source 22 is applied through an optical system formed by a mirror 23 and condensing optical system 24 to the backside of the recording medium 3, thereby giving assistance in locally heating-up the recording medium 3.

The recording probe 26 at its tip is inserted in a region of near-field light localized on the surface of the recording medium 3 and caused to access a desired point on the recording medium 3. This causes the near-field light 29 to scatter at the tip of the recording probe 26, producing scattered light (propagation light). This propagation light has energy having an intensity distribution greater in a vicinity of the tip of the recording probe 26. Due to this, an intensified energy region 30 is caused to overlap with the energy given off by the localized near-field light 29 in a desired point on the recording medium 3 accessed by the tip of the recording probe 26. The intensified energy region 30 provides the phase change film with heating reaching a phase shift temperature in a desired point on the recording medium 3 as could not be attained by the energy of only a near-field light. Thus, high density information recording is made possible on the recording medium 3.

To reproduce the information recorded by the intensified energy region 30, laser light 28 comparatively weak in intensity is applied to the backside of the recording medium 3 such that the intensified energy region 30 in the information recording as mentioned above has an intensity such that the phase change film is not raised to the phase shift temperature. The laser light 28 comparatively weak in intensity produces near-field light 29 having similarly comparatively weak intensity. The recording probe 26 at the tip is inserted in a region of the produced near-field light 29 to scatter the near-field light 29, thereby obtaining scattered light (propagation light) 31. The obtained propagation light 31 is guided to not-shown photodetector by the focusing optical system 27. Accordingly, a recording state of information is determined in a point on the recording medium 3 accessed by the tip of the recording probe, from an intensity or phase of the propagation light 31. Thus, the reproducing of the information recorded on the recording medium 3 is achieved.

Figure 11:
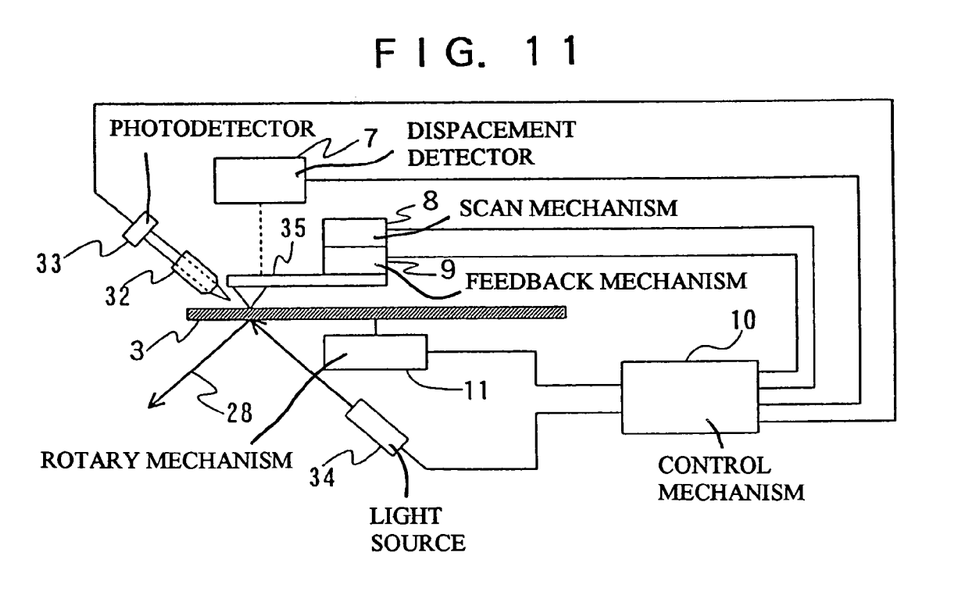
FIG. 11 is a view for explaining an information recording apparatus according to Embodiment 3 of the invention.

FIG. 11 illustrates a block configuration diagram of an information recording apparatus for practicing information recording explained in FIG. 10. Incidentally, the parts common to those of FIG. 1 are denoted by the same reference numerals.

In FIG. 11, a cantilever type optical probe 35 is adopted as a recording probe. A control system for causing the cantilever type optical probe 35 at its tip to access a recording medium, i.e. a probe displacement detector mechanism 7, a scan mechanism 8, a feedback mechanism 9 and a rotary mechanism 11, are controlled by a control mechanism 10, similarly to a conventional AFM technology as was explained in Embodiment 1.

To record information to a recording medium 3 provided on the surface with a phase change film, a tip of the cantilever type optical probe is positioned in a desired recording position on the recording medium 3 and caused to access the recording medium 3. Subsequently, the laser light given off by a laser light source 34 is applied toward a backside of the recording medium 3, particularly to a desired recording point on the surface of the recording medium 3, preferably under a total reflection condition to the backside of the recording medium 3. The laser light 28 produces near-field light on the recording medium 3. The cantilever type optical probe 35 accessed to the recording medium 3 is inserted at its tip in a region of the produced near-field light. This produces intensified energy region mentioned before, thus achieving local heating in a desired point on the recording medium 3 and hence recording information onto the recording medium 3.

Incidentally, the above recording control of information uses the feedback mechanism 9 capable of controlling the position of the cantilever type optical probe 25 in a Z direction. In a recording point, the cantilever type optical probe 35 at its tip is caused to access very closely to a surface of the recording medium 3 thus carrying out recording. In a non-recording point, the cantilever type optical probe 35 is put lifted.

Alternatively, the light source 34 may be connected to control the illumination timing of laser light 28 thereby illuminating laser light 28 at desired timing, i.e. at a time that the cantilever type optical probe 35 at its tip is positioned at a recording point on the recording medium 3. When positioned in a non-recording position, laser light 28 will not be applied. This also makes possible to record information. In this case, in particular, there is no necessity of contacting the tip of the cantilever type optical probe 35 with the recording medium 3 at all times. Accordingly, non-contact control and dynamic control as stated before can be adopted for Z-axis control of the cantilever type optical probe 35 by the feedback mechanism 9.

To reproduce the information recorded as above, as stated before laser light 28 weaker in intensity as compared to the case of recording is applied to a backside of the recording medium 3 thereby producing near field light comparatively weak in intensity on the surface of the recording medium 3. The cantilever type optical probe 35 at its tip is positioned in an information reproducing point by the above-stated control system. The cantilever type optical probe 35 at its tip is inserted in a region of the produced near-field light to scatter the near-field light. The obtained scattering light (propagation light) 31 is guided by a focusing optical system 32 to a photodetector 33. Through a control mechanism 10, a not-shown signal processing part determines an information recording state in a desired reproducing state, i.e. in a position on the recording medium 3 where the cantilever type optical probe 35 at its tip accesses.

Figure 12:
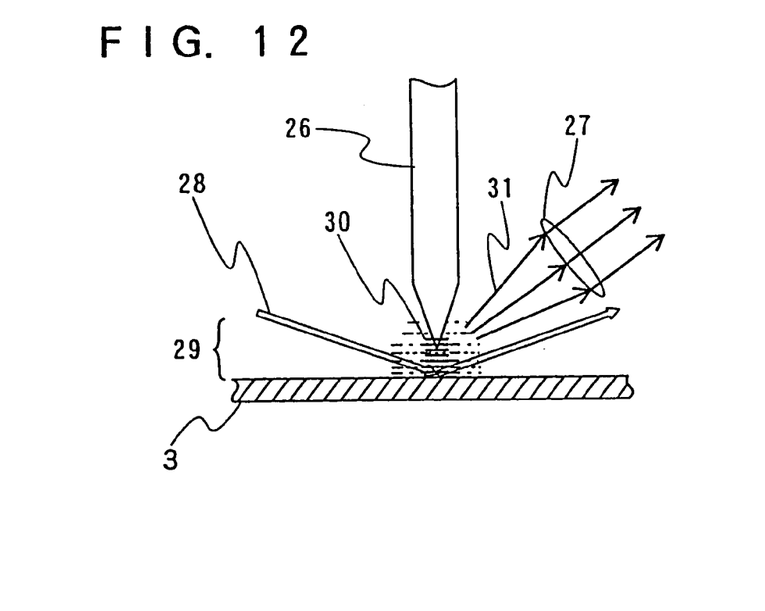
FIG. 12 is a view showing a modification to the information recording method according to Embodiment 3 of the invention.
Figure 13:
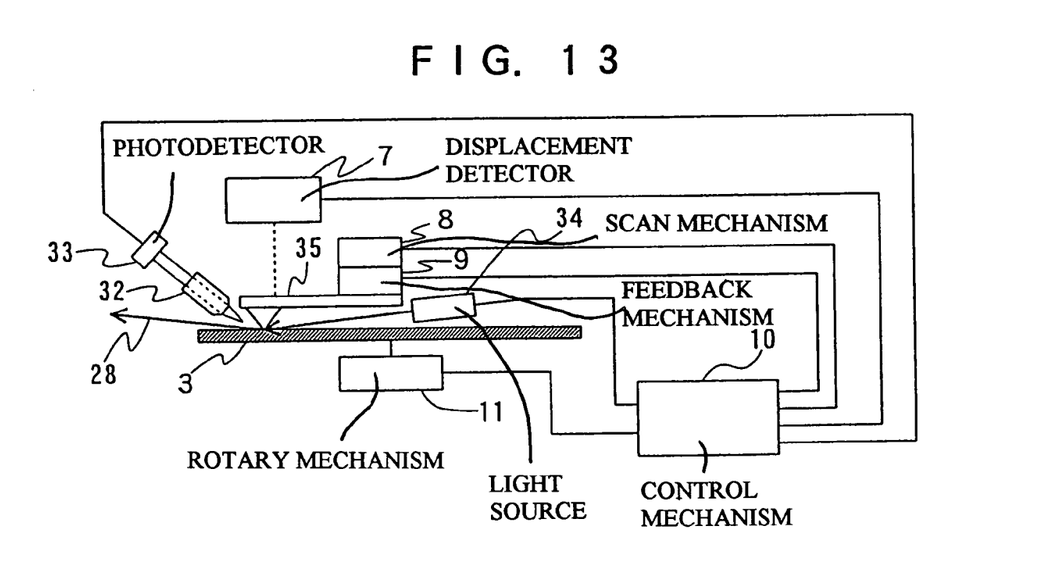
FIG. 13 is a view showing a modification to the information recording apparatus according to Embodiment 3 of the invention.

Meanwhile, FIG. 12 and FIG. 13 are figures illustrating modifications to the information recording methods and information recording apparatuses therefor as explained in FIG. 10 and FIG. 11. Incidentally, the parts common to those of FIG. 10 and FIG. 11 are denoted by the same reference numerals.

In FIG. 12, only an illumination direction of laser light 28 is different from the explanation in FIG. 10. Laser light 28 is applied to the surface of a recording medium 3 and toward a desired recording point thereof, thereby producing near-field light 29 at and around the desired recording point. The operation of information recording and reproducing of the produced near-field light 29 is similar to the explanation in FIG. 10 stated above, and explanation thereof will be omitted herein. Meanwhile, FIG. 13 is different from the explanation of FIG. 11 only in that a laser light source 34 is arranged on the surface side of a recording medium 3 to apply laser light 28 to the surface of the recording medium 3 and toward a desired recording point thereof. The operation in information recording and reproducing with near-field light produced by applying laser light 28 to the surface of the recording medium 3 and toward a desired recording point to reproducing near-field light at and around the desired recording point thereof is similar to the explanation in FIG. 11 as stated above, and explanation thereof being omitted similarly to FIG. 12.

Accordingly, information recording is possible also by applying laser light 28 to the surface of the recording medium 3, i.e. to a recording surface. Particularly, in this case, there is no necessity of transmission of laser light into the recording medium. Hence, information recording is feasible for a recording medium not sufficiently transmissive of laser light.

In all the embodiments explained above, contact control, non-contact control, dynamic control or the like is possible to adopt for control in making the recording probe to access and scan a recording medium. Besides, the recording probe at its tip may be merely contacted with a recording medium by an extremely small force without conducting feedback control.

INDUSTRIAL APPLICABILITY

As explained above, according to the present invention, a material changeable in heated part property is adopted as a recording medium. The apparatus is structured such that the probe tip used in a near-field microscope is positioned over the recording medium to radiate heat through the probe. Due to this, heating is possible to a microscopic region on the recording medium. Thus, high density recording of information can be made as can be detected and reproduced of near-field light by the near-field microscope technology.

Also, the use of a heater element as the heat radiating means makes it possible to directly arrange the heater element on the recording probe, achieving efficient heat transfer and making the apparatus structure more compact.

Also, the use of a laser light source as the heat radiating means makes it possible to freely set a position of heating illumination to the recording probe. Because a cantilever small in spring constant used in the conventional AFM can be used, the probe tip can be accessed to the surface of the recording medium by contact control as in the AFM technology, thus increasing an amount of heat to the recording medium.

Also, the use of a probe having a microscopic aperture makes it possible to utilize the laser light emitted from a laser light source used as the heat radiating means as optical energy to produce near-field light. Thus, higher density of recording is possible by utilizing, as thermal energy, near-field light having energy in a microscopic region.

Also, because the surface excepting the probe tip is coated with a metal film, the laser light emitted from a laser light source used as the heat radiating means can be guided to the microscopic aperture optically sufficiently closed. Further, the laser light can be utilized with higher efficiency as optical energy to produce near-field light. Thus, high density recording of information can be made more positively and with higher reliability.

Also, in addition to the thermal energy offered through the probe tip, an auxiliary heat radiating means is provided for heating to a microscopic region as a recording position on the recording medium. Consequently, the increase in amount of heating to the recording medium is achieved thus enabling recording of information more positively and with higher reliability.

Also, the sharpened probe tip is inserted in a region of the near-field light produced on a recording medium by illuminating a backside of the recording medium to thereby scatter the near-field light. The scattered light and the near-field light are combined to cause intensified energy thereby achieving sufficient amount of heating to the recording medium for recording information. Consequently, high density recording of information can be made as can be detected and reproduced of near-field light by the near-field microscope technology. Further, easily realized is the utilization as an information reproducing apparatus to reproduce information so recorded.

Also, the surface of a recording medium as a recording surface is illuminated to produce near-field light on the surface of the recording medium, obtaining intensified energy. By the intensified energy, localized heating to the recording medium, i.e. information recording, is achieved. Consequently, high density recording of information is made possible without transmission of illumination light through the recording medium upon producing near-field light, i.e. even for an opaque recording medium for illumination light.

Also, the probe tip used in a near-field microscope is accessed to a recording medium to scan the probe tip to a desired position on the recording medium. Heat energy is radiated through the probe tip to locally heat the recording medium, thereby enabling microscopic and localized heating and hence high density recording of information.

Also, in addition to the heat energy offered through the probe tip, an auxiliary heating process is provided for further heating to the region where the heat energy is radiated, enabling sufficient amount of heating more positively and hence high density recording of information with higher reliability.

Also, a backside of a recording medium is illuminated to produce near-field light on the surface of the recording medium. The sharpened probe tip is inserted in a region of the produced near-field light to scatter the near-field light. The scattered light and the produced near-field light are combined to cause intensified energy having greater thermal energy, enabling sufficient amount of heating for recording information to the recording medium and hence high density recording of information positively.

Also, the surface of a recording medium as a recording surface is illuminated to produce near-field light on the surface of the recording medium. The probe tip is inserted in a region of the near-field light to cause intensified energy to achieve greater amount of heating to the recording medium. Thus, positive and high density recording of information is made possible even for an opaque recording medium for illumination light.

What is claimed is:

1. An information recording apparatus comprising:
   a probe for producing or scattering near field light for reading or recording information;
   probe access means for causing a tip of the probe to access a desired region of a recording medium where the information is to be read or recorded;
   probe scanning means for scanning the tip of the probe across a surface of the recording medium; and
   heat radiating means for radiating heat through the tip of the probe in the vicinity of the produced or scattered near field light to heat the desired region of the recording medium to record information on the recording medium;
   wherein the surface of the recording medium is provided with a thin film that varies in physical properties in response to heating of the surface by the tip of the probe.

2. An information recording apparatus according to claim 1; wherein the heat radiating means comprises an electric heating element provided on the probe for heating the tip of the probe.

3. An information recording apparatus according to claim 1; wherein the heat radiating means comprises a laser light source for projecting laser light through the tip of the probe.

4. An information recording apparatus according to claim 3; wherein the probe has a microscopic aperture at the tip thereof, and the laser light source introduces light through the microscopic aperture.

5. An information recording apparatus according to claim 4; wherein the tip of the probe has a metal film formed on a surface thereof except for the microscopic aperture.

6. An information recording apparatus according to any one of claims 1 to 5; further comprising auxiliary heat radiating means for heating the recording medium without radiating heat through the tip of the probe.

7. An information recording apparatus according to claim 1; wherein the probe comprises a cantilever probe; and the heat radiating means comprises a laser light source for projecting a laser light through the cantilever probe so as to radiate the recording medium through the tip of the probe.

8. An information recording apparatus according to claim 7; wherein the probe has a microscopic aperture at the tip, a diameter of the aperture being smaller than a wavelength of the laser light.

9. An information recording apparatus according to claim 1; wherein the probe comprises a cantilever probe; and the heat radiating means comprises a heating element attached to the probe for heating the tip of the probe.

10. An information recording apparatus according to claim 1; wherein the probe comprises an optical waveguide probe having a waveguide portion and a sharpened tip portion; and the heat radiating means comprises a laser light source for projecting a laser light through the optical waveguide portion so that the light is projected onto the desired region of the recording medium through the sharpened tip portion.

11. An information recording apparatus according to claim 10; wherein the probe has a microscopic aperture at the tip portion, a diameter of the aperture being smaller than a wavelength of the laser light.

12. An information recording apparatus according to claim 10; wherein the probe comprises an optical fiber.

13. An information recording apparatus according to claim 1; wherein the thin film comprises a phase change film.

14. An information recording apparatus according to claim 1; wherein the recording medium comprises an optical phase shift recording medium, and a combined heat produced by the heat radiating means and the near field light is sufficient to cause the recording medium to reach a phase shift temperature thereof.

15. An information recording apparatus according to claim 1; wherein the heat radiating means heats the desired region of the recording medium to a temperature insufficient to change the physical properties of the recording medium, and insertion of the probe tip in the vicinity of the heated region of the recording medium locally intensifies thermal energy applied by the heat radiating means to heat the recording medium in the desired region to a temperature sufficient to change the physical properties.

16. An information recording means comprising:
   a probe having a sharpened tip;
   probe access means for causing the tip of the probe to access a desired region of a recording medium;

probe scanning means for scanning the tip of the probe across a first surface of the recording medium; and an illumination light source for illuminating a second surface of the recording medium opposite the first surface with illumination light so that a near field light is produced above the first surface of the recording medium for reading or recording information on the recording medium;

wherein the first surface of the recording medium is provided with a thin film that varies in physical properties in response to heating of the surface; and wherein the illumination light is set at a first intensity insufficient to vary the physical properties of the thin film for reading information on the recording medium, and a second intensity sufficient to vary the physical properties of the thin film only when the tip of the probe accesses the desired region while the second surface of the recording medium is illuminated with the illumination light at the second intensity for recording information at the desired region of the recording medium.

17. An information recording apparatus according to claim 16; wherein the illumination light source further illuminates the first surface of the recording medium to produce a near field light above the first surface of the recording medium.

18. An information recording apparatus according to claim 17; wherein the recording medium comprises an optical phase shift recording medium, and a combined heat produced by the illumination light source is sufficient to cause the recording medium to reach a phase shift temperature thereof when the probe is in close proximity to the desired region of the recording medium.

19. A method of recording information comprising:
a probe access process of causing a tip of a probe to access a recording medium to produce or scatter near field light for reading or recording information;
a probe scanning process of scanning the tip of the probe to a desired position on the recording medium; and
a heat recording process of radiating heat energy through the tip of the probe to locally heat the recording medium proximate the near field light to record information at the desired position on the recording medium.

20. A method of recording information according to claim 19; further comprising an auxiliary heating process of locally heating the recording medium using an auxiliary heating device that does not radiate heat energy through the tip of the probe.

21. A method of recording information including:
an illumination process of illuminating a desired position on a surface of a recording medium to produce near field light above the surface of the recording medium at the desired position;
a probe access process of causing a sharpened tip of a probe to access the desired position of the recording medium to record information on the recording medium by locally intensified energy caused by insertion of the tip of the probe in the near field light at the desired position; and
a probe scanning process of scanning the tip of the probe across the surface of the recording medium to the desired position on the recording medium to record the information.

22. A method of recording information according to claim 21; wherein the illumination process comprises a process of illuminating a surface of the recording medium opposite a surface to which the sharpened tip of the probe is accessed so as to produce near field light on the surface of the recording medium accessed by the sharpened tip.

23. An information recording apparatus comprising: a probe having a tip for producing or scattering near field light above a surface of a recording medium for reading or recording information on the recording medium, the surface of the recording medium being formed of a material having a physical property that varies in response to the application of thermal energy thereto; means for causing the probe tip to come into close proximity with the surface of the recording medium and scanning the probe tip across the surface of the recording medium; and heat generating means for heating a desired region of the surface of the recording medium to change the physical property of the coating material in the desired region to record information on the recording medium.

24. An information recording apparatus according to claim 23; wherein the heat generating means heats the desired region of the recording medium to a temperature insufficient to change the physical property of the recording medium, and insertion of the probe tip in the vicinity of the heated region of the surface locally intensifies thermal energy applied by the heat generating means to heat the recording medium in the desired region to a temperature sufficient to change the physical property.

25. An information recording apparatus according to claim 23; wherein the heat generating means comprises an electric heating element.

26. An information recording apparatus according to claim 23; wherein the heat generating means comprises a laser light source for producing a laser light for irradiating and thereby heating the desired region of the recording medium.

27. An information recording apparatus according to claim 26; wherein the laser light is irradiated on a surface of the recording medium opposite the surface to which the probe tip is brought into close proximity so that the near field light is produced on the surface to which the probe tip is brought into close proximity, and insertion of the probe tip in a region of the near field light produces locally intensified energy for heating the recording medium to change the physical property thereof to cause information to be recorded on the recording medium.

28. An information recording apparatus according to claim 26; wherein the probe tip has a microscopic aperture, and the laser light is projected through the microscopic aperture to heat a microscopic region of the recording medium.

29. An information recording apparatus according to claim 28; wherein the probe tip has a metal film formed on a surface thereof except for the microscopic aperture.

30. An information recording apparatus according to claim 23; wherein the heat generating means comprises a laser light source for producing a laser light and projecting the laser light through the probe tip to irradiate and thereby heat the desired region of the recording medium, and an auxiliary heat source for heating the desired region of the recording medium without heating the probe tip, so that the combined heat produced by the laser light source and the auxiliary heat source is sufficient to change the physical property of the recording medium in the desired region.

31. A method of using a scanning probe instrument to record information on a recording medium, comprising the steps of:
providing a recording medium having a coating that changes in physical characteristics in response to an applied energy;

generating near field light in the vicinity of a desired region of the recording medium at which information is to be recorded; and causing a tip of a probe of the scanning probe instrument to come into close proximity with the recording medium at the desired region to generate sufficient energy in the desired region to record information onto the recording medium.

* * * * *